Patented June 3, 1930

1,762,069

UNITED STATES PATENT OFFICE

ROBERT MEZGER, OF STUTTGART, GERMANY, ASSIGNOR TO THE FIRM PAUL LECHLER, OF STUTTGART, GERMANY

BITUMINOUS PAINT

No Drawing. Application filed March 6, 1925, Serial No. 13,653, and in Germany April 26, 1924.

My invention refers to bituminous products which contain metal soaps in suspension. It is an object of my invention to provide paints of the kind aforesaid which consist of a bituminous product combined with one or several metal soaps, the products in all cases forming stable suspensions.

It is well known to those skilled in the art that the sebacic acid salt of alumina has already been admixed with bituminous lacquers, but it is equally well known that it is very difficult to uniformly distribute the sebacic acid salt of alumina in bituminous paints in such manner that a stable suspension is formed in which the sebacic acid salt of alumina is evenly distributed in a very fine state of subdivision.

I have now ascertained that metal soaps, other than those having alkali, alkaline earth or aluminum, as the metallic constituent, can be readily and thoroughly suspended in paints of this kind so as to form a stable suspension in which the metal soap is contained in a state of extremely fine subdivision by first emulsifying an alkali metal soap dissolved in a small quantity of water by vigorously stirring it with the bituminous paint, and while continuing stirring gradually adding a water soluble salt of a suitable metal other than an alkali metal. An amount of such salt approximately chemically equivalent to the amount of the alkali metal soap, is preferably used, so as to convert all of the acid radical of the soap into a "metallic soap" which is insoluble in water. If the mixture is allowed to stand the non-miscibility and the different specific gravities of the solution of alkali metal salt produced by the reaction between the soap and the other metal salt on the one hand and the organic bituminous solution carrying the finely suspended metallic soap on the other hand will cause the alkali metal salt solution to settle either on top or below, so that the whole of the resulting alkali metal salt solution can be separated by well known means from the paint containing the bituminous substance and carrying the other metal soap in suspension.

Obviously, in this manner also combinations of two or more metal soaps other than alkali metal soaps can be incorporated in the bituminous paint in the form of a fine suspension.

Special advantages are derived from this process for the production of bituminous ship's bottom paints or coatings which being resistant to sea water are well known to be superior to oil and varnish paints provided that means be found for intimately admixing into these paints such poisonous matter as prevents a growth of organisms of all kinds on the ship's bottom. According to the present invention this can easily be effected by incorporating poisonous metal soaps, such as copper or mercury soaps.

Example:—

54 parts by weight of coal-tar-pitch are dissolved in 17 parts by weight of chlorobenzene and 12 parts by weight of ethane tetrachloride. To this solution is added, with vigorous stirring, a solution of 7 parts by weight of yellow soft soap (potash soap) containing 42% fatty acid (which may even be sebacic acid) in 10 parts by weight of water and stirring is continued up till the soft soap is entirely emulsified. Under continuous stirring a solution of 1.4 parts by weight of corrosive sublimate in 50 parts by weight of water is gradually added. The stirring is then discontinued. At the end of several hours' rest the potassium chloride solution which has formed settles on top of the bituminous solution containing the mercury soap in suspension. The said soap is in suspension and not in solution in the vehicle because it is insoluble therein. The bituminous suspension and the watery salt solution are then separated in a well known manner. In order to make the bituminous suspension ready for painting 5 parts by weight of crude cresols and 8 parts by weight of solvent naphtha are added to it.

I wish it to be understood that I do not desire to be limited to the exact substances, proportions and sequences of operations described, for obvious modifications will occur to a person skilled in the art.

I claim:—

1. The method of producing bituminous paints, containing metal soaps comprising forming an emulsion from a bituminous paint, and a watery solution of an alkali metal soap, admixing with the emulsion thus formed a watery solution of substantially molecular quantity of a salt of a metal other than an alkali metal and separating the watery alkali metal salt solution formed from the bituminous suspension of the metal soap.

2. The method of producing bituminous paints, containing metal soaps, comprising adding to a bituminous paint, a watery solution of an alkali metal soap under vigorous stirring so as to emulsify the mixture, adding under continuous stirring a predetermined quantity of a watery solution of substantially molecular quantity of a salt of a metal of which the soaps are insoluble, allowing the watery solution of the alkali metal salt formed by reaction to settle on top of the bituminous emulsion containing the metal soap in stable suspension and separating this emulsion from the supernatant layer.

3. The method of producing bituminous paints, containing metal soaps comprising dissolving 54 parts by weight of coal tar pitch in 17 parts of chlorbenzene and 12 parts of ethane tetrachloride, adding to the solution under stirring a concentrated solution of 7 parts of potash soap, stirring sufficiently to produce emulsification, adding a dilute watery solution of 1.4 parts of corrosive sublimate and separating the potassium chloride solution from the emulsion.

4. A process which comprises emulsifying a liquid containing a bituminous material, with an aqueous soap solution, thereafter well mixing the said emulsion with a solution of a salt of a metal other than an alkali metal, to precipitate a finely divided soap of the metal of such added salt, and thereafter separating the aqueous solution of alkali metal salt formed, from the suspension of metallic soap in said bituminous material, the soap solution used containing a fatty acid that forms a metallic soap with the salt used, which metallic soap is not soluble in the liquid bituminous material used.

5. A bituminous paint comprising a substantially dry stable suspension of a fatty acid soap of a metal other than an alkali metal, in a coal tar pitch solution in which such soap is insoluble.

6. A bituminous paint comprising a substantially dry stable suspension of a poisonous metal soap of a fatty acid in a coal tar pitch solution.

In testimony whereof I affix my signature.
DR. ROBERT MEZGER.